(12) United States Patent
Ito et al.

(10) Patent No.: US 9,065,370 B2
(45) Date of Patent: Jun. 23, 2015

(54) WIND POWER GENERATION DEVICE

(76) Inventors: Ryosuke Ito, Shinjuku (JP); Takanori Okubo, Nishitokyo (JP); Tadaaki Chikashige, Kawasaki (JP); Takashi Yamazaki, Kiyose (JP); Hikaru Matsumiya, Setagaya (JP)

( * ) Notice: Subject to any disclaimer, the term of this patent is extended or adjusted under 35 U.S.C. 154(b) by 449 days.

(21) Appl. No.: 13/395,520

(22) PCT Filed: Sep. 14, 2010

(86) PCT No.: PCT/JP2010/065845
§ 371 (c)(1),
(2), (4) Date: Sep. 28, 2012

(87) PCT Pub. No.: WO2011/034056
PCT Pub. Date: Mar. 24, 2011

(65) Prior Publication Data
US 2013/0009397 A1 Jan. 10, 2013

(30) Foreign Application Priority Data
Sep. 16, 2009 (JP) .................................. 2009-214165

(51) Int. Cl.
*H02P 9/04* (2006.01)
*H02P 9/30* (2006.01)
(Continued)

(52) U.S. Cl.
CPC ............... *H02P 9/305* (2013.01); *Y02E 10/723* (2013.01); *Y02E 10/725* (2013.01); *H02J 3/386* (2013.01);
(Continued)

(58) Field of Classification Search
CPC .............................. F03D 9/002; Y02E 10/723
USPC ...................................................... 290/44, 55
See application file for complete search history.

(56) References Cited

U.S. PATENT DOCUMENTS 7,042,110 B2 * 5/2006 Mikhail et al. ................... 290/44
7,880,319 B2 * 2/2011 Takeuchi ........................ 290/44
(Continued)

FOREIGN PATENT DOCUMENTS

CN 101263650 A 9/2008
JP 2008-005612 1/2008
(Continued)

OTHER PUBLICATIONS

"Chinese Application Serial No. 201080040464.5, Office Action mailed Jan. 6, 2014", (w/ English Translation), 13 pgs.
(Continued)

*Primary Examiner* — Tulsidas C Patel
*Assistant Examiner* — Sean Gugger
(74) *Attorney, Agent, or Firm* — Schwegman Lundberg & Woessner, P.A.

(57) ABSTRACT

Provided is a wind power generation apparatus to which general purpose inverters are applicable. An inverter in a constant-voltage mode is used. While a wind power generator is generating electricity, switching circuits are turned on and off at a controlled duty cycles to intermittently short-circuit an armature winding, boosting the voltage and controlling the rotational speed of a windmill rotating blade, with the result that the voltage applied to the inverter is made constant. At the activation, in order to prevent an excessive voltage from being generated while an inverter is changing from the stand-by state to the activated state, ON/OFF control of a switching circuit is performed to switch between the output voltage of a rectifier and the voltage generated at a resistor, with the result that the voltage is controlled and maintained at an appropriate value.

4 Claims, 4 Drawing Sheets

(51) Int. Cl.
  *H02J 3/38* (2006.01)
  *H02M 7/219* (2006.01)
  *H02P 3/22* (2006.01)
  *H02P 101/15* (2015.01)

(52) U.S. Cl.
  CPC .................. *H02M 7/219* (2013.01); *H02P 3/22* (2013.01); *Y02E 10/763* (2013.01); *H02P 2101/15* (2013.01)

(56) References Cited

U.S. PATENT DOCUMENTS

| | | |
|---|---|---|
| 8,018,081 B2 | 9/2011 | Calley |
| 2003/0071467 A1* | 4/2003 | Calley et al. ............... 290/44 |
| 2007/0013194 A1 | 1/2007 | Calley |
| 2007/0024059 A1 | 2/2007 | D'Atre et al. |
| 2007/0216163 A1* | 9/2007 | Guang et al. ............... 290/44 |
| 2010/0036853 A1* | 2/2010 | Jones ............................. 707/10 |
| 2010/0096853 A1* | 4/2010 | Woldmann et al. ......... 290/44 |
| 2010/0123314 A1* | 5/2010 | Menke ......................... 290/44 |
| 2010/0166567 A1 | 7/2010 | Calley |
| 2011/0042951 A1* | 2/2011 | Shinya et al. ............... 290/44 |
| 2012/0061966 A1 | 3/2012 | Ito et al. |

FOREIGN PATENT DOCUMENTS

| | | |
|---|---|---|
| JP | 2009-502104 A | 1/2009 |
| JP | 2010-275926 A | 12/2010 |
| WO | WO-2007109048 A2 | 9/2007 |

OTHER PUBLICATIONS

"European Application Serial No. 10817169.5, Extended European Search Report mailed Sep. 18, 2013", 7 pgs.

"International Application No. PCT/JP2010/065845, International Search Report mailed Dec. 21, 2010", 3 pgs.

"International Application No. PCT/JP2010/065845, International Preliminary Report on Patentability dated Aug. 23, 2011", 10 pgs.

"International Application No. PCT/JP2010/065845, Written Opinion mailed Dec. 21, 2010", 4 pgs.

\* cited by examiner

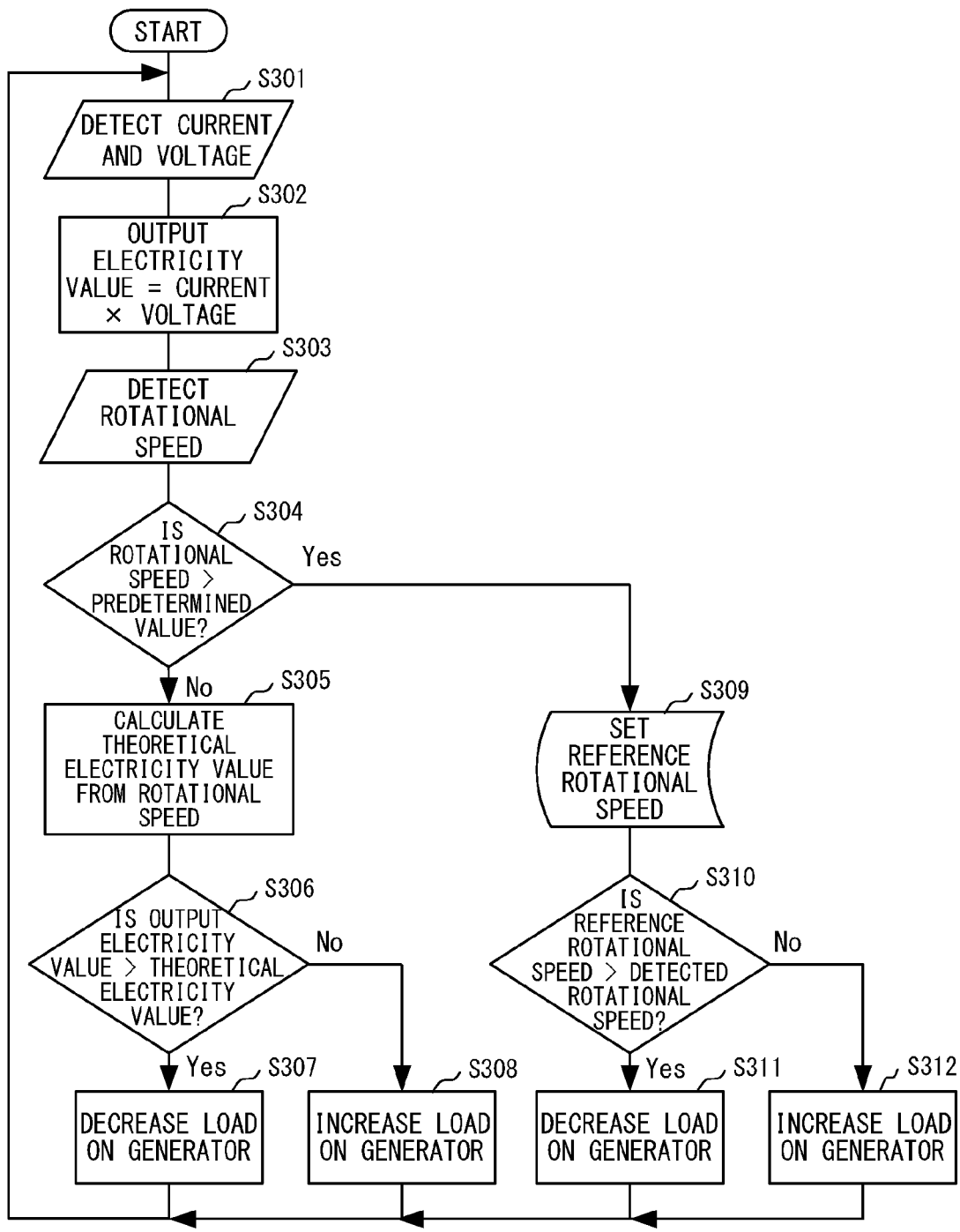
F I G. 2

WIND POWER GENERATION DEVICE

PRIORITY CLAIM TO RELATED APPLICATIONS

This application is a national stage application under 35 U.S.C. §371 of PCT/JP2010/065845, filed Sep. 14, 2010, and published as WO 2011/034056 A1 on Mar. 24, 2011, which claims priority to Japanese Application No. 2009-214165, filed Sep. 16, 2009, which applications and publication are incorporated by reference as if reproduced herein and made a part hereof in their entirety, and the benefit of priority of each of which is claimed herein.

TECHNICAL FIELD

The present invention relates to a wind power generation apparatus.

BACKGROUND ART

Recently, there has been a frequent occurrence of abnormal weather in association with global warming. Many glaciers in the polar regions have been reported to be melting due to global warming. It has been predicted that the abnormal weather will destroy or change the global ecosystem greatly. To maintain safe and life-friendly environments for future generations, it is necessary to prevent such environmental disruptions that are due to global warming. A main reason for global warming is thought to be the emission of a large amount of carbon dioxide into the atmosphere. This happens because, in modern civilization, energy is obtained mainly by burning fossil fuels such as coal and oil. To obtain energy while preventing global warming, accordingly, an energy source is needed which does not depend on conventional fossil fuels.

As such new energy sources, wind power and sunlight have been focused on. In consideration of this, wind power generation and solar power generation are being actively researched and developed in various countries.

In the meantime, to use generated electricity as a commercial power supply, inverters are required for wind power generation and solar power generation. However, wind power generation and solar power generation are adapted to different rated voltages, and hence a dedicated inverter has needed to be developed for each method of power generation. This causes delays in the release of newly developed wind power generators to the market and decreases the compatibility between wind power generators and solar power generators. Accordingly, ideas are needed for applying general purpose inverters to the generators and, in particular, to wind power generators.

SUMMARY OF THE INVENTION

Problems to be Solved by the Invention

An object of the present invention is to provide a wind power generation apparatus to which general purpose inverters are applicable.

Means for Solving the Problems

A wind power generation apparatus in accordance with the present invention comprises: a generator composed of a magnet and an armature winding and having a windmill rotating blade; switch means for controlling the rotational speed of the windmill rotating blade by short-circuiting the armature winding at a controlled duty cycles; shunt means for controlling the output voltage by intermittently connecting a resistor to an output of the generator; and control means, wherein, when an inverter is connected as a load, then, before the inverter is activated, the control means controls and maintains the rotational speed of the windmill rotating blade at a predetermined value by using the switch means and controls and maintains the output voltage at a predetermined value by using the shunt means to prevent a voltage applied to the inverter from becoming too high, and, after the inverter is activated, the control means uses the switch means to control the rotational speed of the windmill rotating blade to maintain a constant value of the voltage applied to the inverter.

Effect of the Invention

In accordance with the present invention, a wind power generation apparatus to which general purpose inverters are applicable may be provided.

BRIEF DESCRIPTION OF THE DRAWINGS

FIG. 2 is a flowchart indicating the control flow of switching circuits 40-1 to 40-3 in FIG. 1.

DESCRIPTION OF THE PREFERRED EMBODIMENTS

In the present embodiment, in order to intersystem-connect (Grid tie) the output of a wind power generation apparatus to a commercial power source by using an inverter designed for intersystem-connection, the inverter is provided with a constant-voltage input characteristic in advance, the output voltage of a wind power generator is boosted to an input voltage required for the inverter, and the output voltage of a wind power generation apparatus is controlled and maintained at a constant voltage which does not depend on the change in the wind speed. In this example, an intersystem-connection indicates the interconnection between a generator and a load for each of which a different rated power is defined.

In order to intersystem-connect the output of a wind power generation apparatus to a commercial power source by using an inverter designed for intersystem-connection, the blade of a wind power generation apparatus is controlled and maintained at a constant rotational frequency determined in advance.

In addition, to provide inductance required for the voltage boosting and the rotational frequency control, an armature coil of the generator is used.

In order to intersystem-connect the output of a wind power generation apparatus to a commercial power source by using an inverter designed for intersystem-connection, the rotational frequency of the wind power generator is decreased to a predetermined value to decrease the output voltage if the operation of the inverter is shut down.

In addition, to perform the electromagnetic brake operation of the wind power generator, the duty width is expanded step by step by referring to the rotational frequency.

Figure 1:
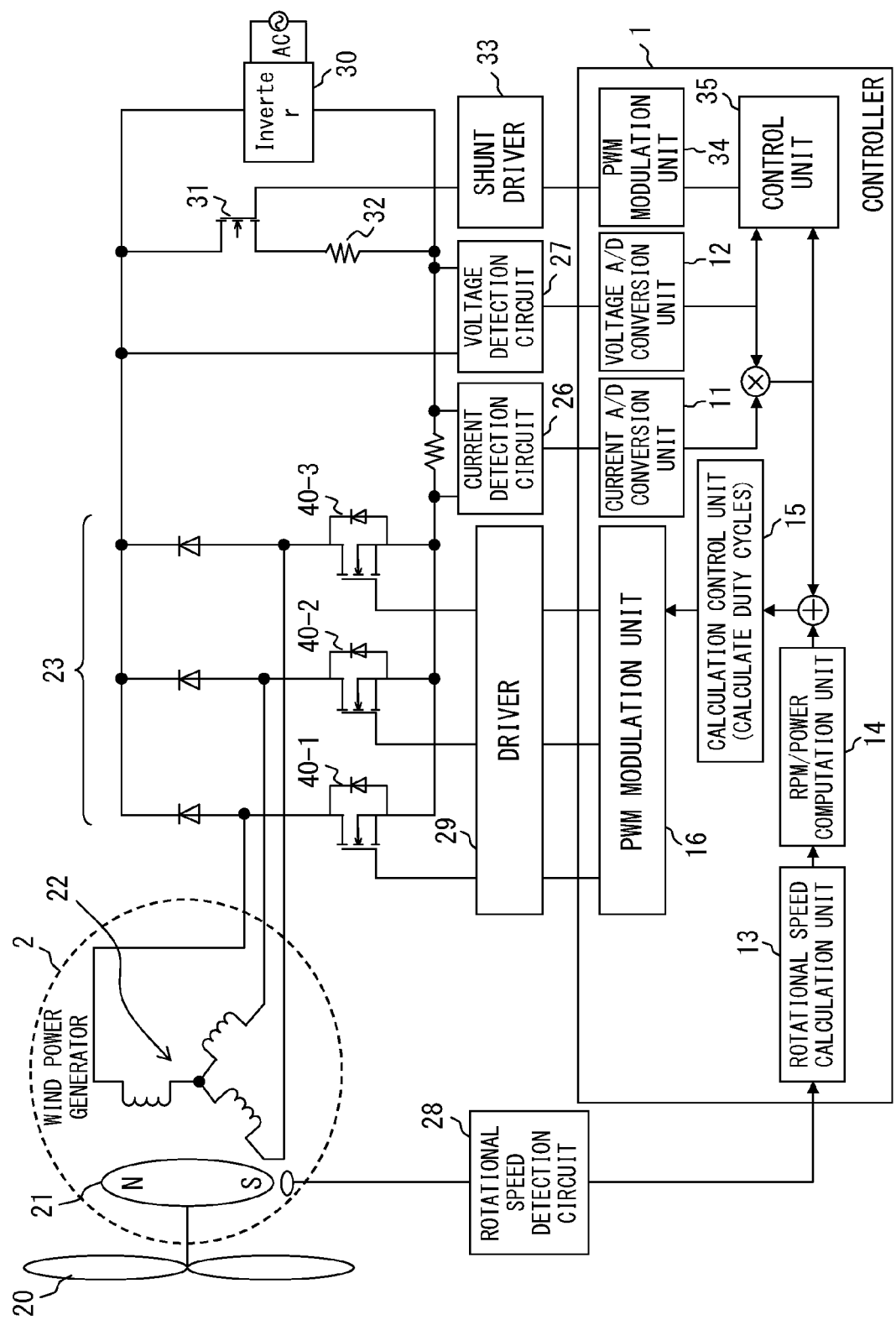
FIG. 1 is a block diagram illustrating a wind power generation apparatus in accordance with an embodiment of the present invention.

FIG. 1 is a block diagram illustrating a wind power generation apparatus in accordance with an embodiment of the present invention.

In FIG. 1, a controller 1 forms a wind power generation apparatus that efficiently generates electricity by controlling a wind power generator 2.

The wind power generator 2 comprises a permanent magnet 21 and a three-phase armature winding 22, and it converts, by using a rectifier 23, an alternating current generated via the rotation of a windmill rotating blade 20 forming a fixed pitch angle into a direct current and supplies electricity to an inverter 30. The pitch angle of the windmill rotating blade 20 is fixed, and hence, in comparison with those with variable pitch angles and those with retractable blades, the windmill rotating blade 20 has a relatively simple structure and seldom fails, and its size and weight are readily decreased.

The controller 1 comprises a current A/D conversion unit 11, a voltage A/D conversion unit 12, a rotational speed calculation unit 13, an rpm/power computation unit 14, a calculation control unit 15, PWM modulation units 16 and 34, and a control unit 35.

The current A/D conversion unit 11 detects, via a current detection circuit 26, the output voltage value of a current output by the wind power generator 2 and converts the analog value into a digital value. The voltage A/D conversion unit 12 detects, via a voltage detection circuit 27, the output voltage value of a voltage output by the wind power generator 2 and converts the analog value into a digital value.

The rotational speed calculation unit 13 obtains the rotational speed of the windmill rotating blade 20 by detecting it via a rotational speed detection circuit 28. The rpm/power computation unit 14 calculates a theoretical output value of the wind power generator 2 on the basis of the rotational speed obtained by the rotational speed calculation unit 13 and a blade aerodynamics characteristic that is determined in advance and particular to the windmill rotating blade 20. In regard to the blade aerodynamics characteristic that is particular to the windmill rotating blade 20, a blade aerodynamics characteristic indicating the relationship between the rotational speed of the windmill rotating blade 20 and the torque generated by the wind power generator 2 may be stored in a memory as a theoretical characteristic table, or a simulated multidimensional formula such as $WP=a \times x^n + b \times x^{n-1} + \ldots + c \times x + d$ (WP=theoretical output value; x=rotational frequency; a, b, c and d=coefficients), e.g., a simulated three-dimensional formula such as $WP = a_1 \times x^3 + b_1 \times x^2 + c_1 \times x + d_1$ (WP=theoretical output value; x=rotational frequency; $a_1$, $b_1$, $c_1$ and $d_1$=coefficients) may be used.

In regard to the rotational speed control, see, for example, Japanese Patent Application No. 2009-129111. Details of simulated theoretical formulae are described herein.

On the basis of the output current value of the output current converted by the current A/D conversion unit 11 and the output voltage value of the output voltage converted by the voltage A/D conversion unit 12, the calculation control unit 15 calculates the output electricity value of the electricity output by the wind power generator 2 at that time, and, on the basis of the calculated output electricity value at that time and the theoretical output value calculated by the rpm/power computation unit 14, the calculation control unit 15 calculates the duty cycles (i.e., the duty factor) of the switching circuits 40-1 to 40-3 of the rectifier 23 so that electricity matching the theoretical output value is output. That is, as is clear from FIG. 1, the switching circuits 40-1 to 40-3 in the OFF state rectify, as usual, the electricity generated at the winding 22, and the switching circuits 40-1 to 40-3 in the ON state short-circuit the winding 22. Short-circuiting the winding 22 causes a surge current to flow through the winding 22, thereby achieving the effect that, when the switching circuits 40-1 to 40-3 are subsequently turned off to supply electricity to the rectifier 23, the generated voltage will be boosted. Simultaneously, the surge current flowing through the winding 22 causes the energy of the surge current to be consumed at the winding 22. The consumption of the surge current causes the consumption of the rotational energy of the windmill rotating blade 20, thereby achieving the effect of braking the rotation of the windmill rotating blade 20. This is the same as connecting a load to the output of the wind power generator 2 to consume the energy so that the rotational speed of the windmill rotating blade 20 is decreased. However, there is a difference in the sense that, if a short circuit is caused by the switching circuits 40-1 to 40-3, the armature winding 22 of the wind power generator 2 serves as the load. Controlling the duty cycles means, controlling the rate of occurrence ON and OFF of the switching circuits 40-1 to 40-3, and, as the rate of occurrence of OFF of the switching circuits 40-1 to 40-3 becomes higher, the degree of the braking of the rotation of the windmill rotating blade 20 becomes higher.

On the basis of the duty cycles calculated by the calculation control unit 15, the PWM modulation unit 16 controls the rotation of the windmill rotating blade 20 via pulse width modulation (PWM) so that the wind power generator 2 outputs electricity matching the theoretical output value. A driver 29 generates a drive voltage to be applied to transistor switches forming the switching circuits 40-1 to 40-3. In particular, in order to brake the rotation of the windmill rotating blade 20, the duty cycles of occurrence ON and OFF of the switching circuits 40-1 to 40-3 is changed so that the time period during which the switching circuits 40-1 to 40-3 are short-circuited is extended step by step. Extending the time period of the short-circuiting causes a surge current to flow through the armature winding 22 for a longer time period, and hence a larger amount of surge current will be consumed at the armature winding 22. Accordingly, a larger amount of rotational energy of the windmill rotating blade 20 is consumed, thereby causing more effective brake actions.

A switching circuit 31 controls a voltage applied to the inverter 30. The switching circuit 31 is turned on or off in accordance with a controlled duty cycles to cause a current to flow through a resistor 32, and the switching circuit 31 switches between the voltage input from the rectifier 23 and the voltage applied to the resistor 32 for the voltage to be applied to the inverter 30, with the result that a predetermined voltage applied to the inverter 30 is controlled and maintained.

The control unit 35 obtains the voltage value of a voltage from the voltage A/D conversion unit 12 and the electricity value which is the product of this voltage value and the current value of a current from the current A/D conversion unit 11, thereby determining the duty cycles of ON and OFF of the switching circuit 31, and the control unit 35 then provides a control signal to the PWM modulation unit 34. In accordance with the control signal from the control unit 35, the PWM modulation unit 34 generates and provides, to a shunt driver 33, a pulse-width-modulated control signal of a predetermined duty cycles. In accordance with the control signal from the PWM modulation unit 34, the shunt driver 33 generates and provides, to a transistor of the switching circuit 31, a driving signal of a predetermined duty cycles.

The inverter 30 may be a general-purpose one, but it preferably is the one with a constant-voltage mode. The constant-voltage mode is a mode wherein the rated value of the input voltage of the inverter 30 is a constant value. In this case, the duty cycles of the switching circuits 40-1 to 40-3 is controlled to apply a predetermined constant voltage to the inverter 30, and hence inverters with various rated voltages may be driven.

FIG. 2 is a flowchart indicating the control flow of the switching circuits 40-1 to 40-3 in FIG. 1.

In step S301, the output current value and output voltage value of the current and voltage output by the wind power generator 2 are detected and obtained, and in step S302, the output electricity value (output electricity=current×voltage) is calculated from these obtained values.

Concurrently, in step S303, the rotational speed of the windmill rotating blade 20 is detected and obtained.

In step S304, it is determined whether the rotational speed obtained in step S303 is higher than a predetermined value or not. The predetermined value may be, for example, a rotational speed of 1000 rms corresponding to a wind speed of 10 m/s.

When it is determined that the rotational speed is not higher than the predetermined value, i.e., when the detected rotational speed is within the rotational speed range of a predetermined wind speed range ("No" in step S304), then, in step S305, a theoretical electricity value is calculated from the rotational speed obtained in step S303. As an example, as the theoretical electricity value, the blade aerodynamics characteristic indicating the relationship between the rotational speed of the windmill rotating blade 20 and the torque generated by the wind power generator 2 may be used, or a simulated multidimensional formula such as $WP=a \times s^n + b \times x^{n-1} + \ldots + c \times x \times d$ (WP=theoretical output value; x=rotational frequency; a, b, c and d=coefficients) or a simulated three-dimensional formula such as $WP = a_1 \times x^3 + b_1 \times x^2 + c_1 \times x + d_1$ (WP=theoretical output value; x=rotational frequency; $a_1, b_1, c_1$ and $d_1$=coefficients) may be used.

Next, in step S306, it is determined whether or not the output electricity value calculated in step S302 is higher than the theoretical electricity value calculated in step S305.

When it is determined that the output electricity value is higher than the theoretical electricity value ("Yes" in step S306), then, in step S307, the switching circuits 40-1 to 40-3 are controlled on the basis of the duty cycles calculated to decrease the electricity output by the wind power generator 2, thereby decreasing the load on the wind power generator 2. Meanwhile, when it is determined that the output electricity value is not higher than the theoretical electricity value ("No" in step S306), then, in step S308, the switching circuits 40-1 to 40-3 are controlled on the basis of the duty cycles calculated to increase the electricity output by the wind power generator 2, thereby increasing the load on the wind power generator 2.

When it is determined in step S304 that the obtained rotational speed is higher than the predetermined value, i.e., when the detected rotational speed is beyond the rotational speed range of the predetermined wind speed range ("Yes" in step S304), a reference rotational speed, e.g., 1000 rpm, is set in step S309.

Next, in step S310, it is determined whether or not the reference rotational speed set in step S309 is higher than the rotational speed detected in step S303.

When it is determined that the reference rotational speed is higher than the detected rotational speed ("Yes" in step S310), then, in step S311, the switching circuits 40-1 to 40-3 are controlled on the basis of the duty cycles calculated to decrease the electricity output by the wind power generator 2, thereby decreasing the load on the wind power generator 2.

Meanwhile, when it is determined that the reference rotational speed is not higher than the detected rotational speed ("No" in step S310), then, in step S312, the switching circuits 40-1 to 40-3 are controlled on the basis of the duty cycles calculated to increase the electricity output by the wind power generator 2, thereby increasing the load on the wind power generator 2.

In this way, the output electricity may be controlled and maintained at a constant value, thereby driving the inverter in the constant-voltage mode. Whatever the rated voltage of the inverter in the constant-voltage mode is, the output of the required rated voltage may be obtained by controlling the duty cycles of the switching circuits 40-1 to 40-3.

Figures 3A, 3B:
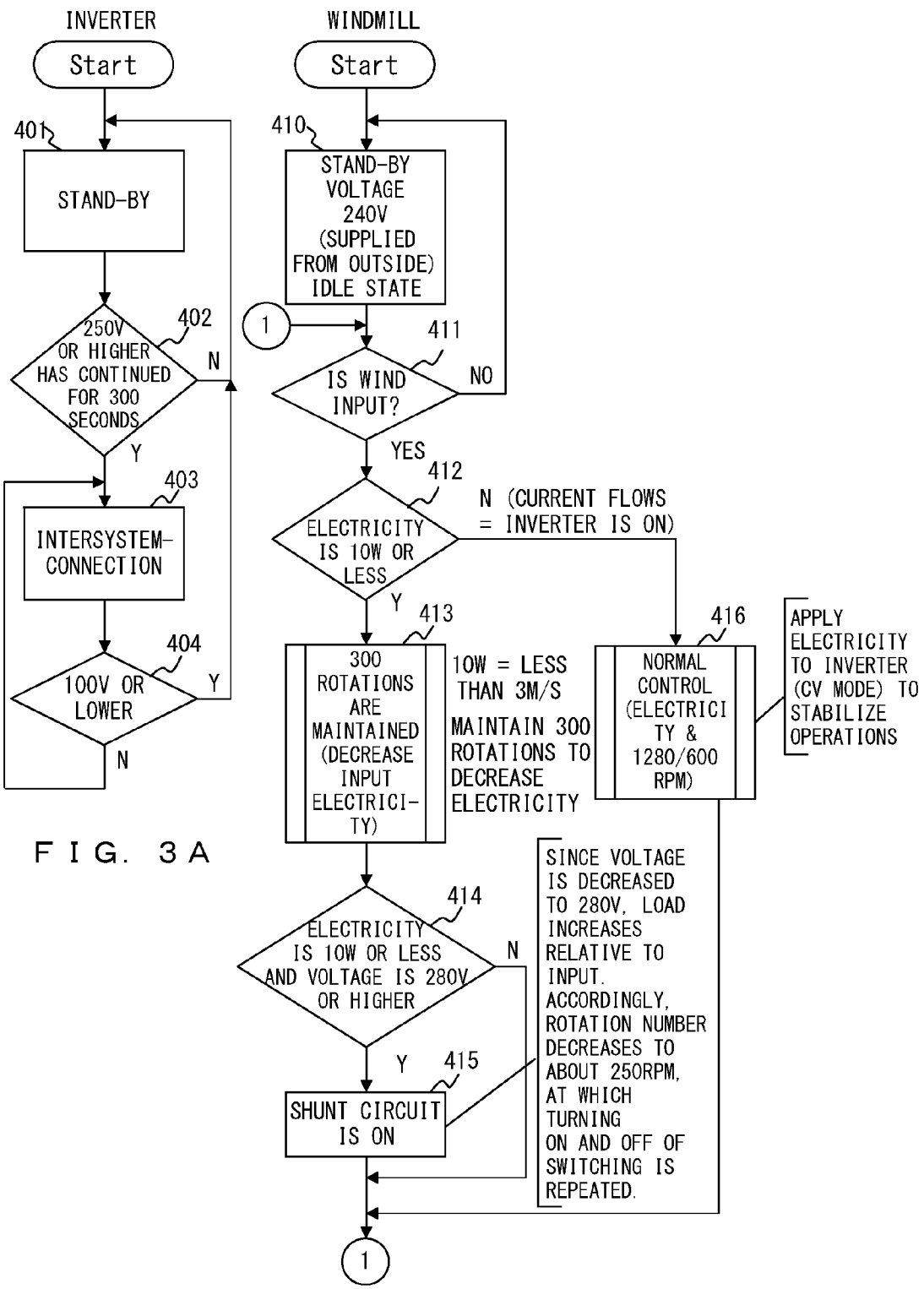
FIGS. 3(a) and 3(b) are each a flowchart illustrating the operation flows of an inverter and wind power generation apparatus before activation of the inverter.

FIGS. 3(*a*) and 3(*b*) are each a flowchart illustrating the operation flows of the inverter and wind power generation apparatus before activation of the inverter.

FIG. 3(*a*) indicates inverter operations. The inverter is initially in the stand-by state as indicated in step S401. Next, the inverter detects whether or not a predetermined voltage has continued for a predetermined time period or longer. Here, as an example, the inverter is activated if 250V of voltage or higher has been applied for 300 seconds during the constant-voltage mode. 300 seconds is used merely as an example, and some inverters are activated when 30 seconds passes. It is determined in step S402 whether 250V has continued for 300 seconds or not, and, when 300 seconds has not passed yet, the stand-by state continues. When the determination in step S402 indicates the judgment of "Yes", then, the inverter is activated in step S403, and the intersystem-connection is achieved, i.e., a wind power generation apparatus and the inverter, each adapted to a different rated voltage, start operations together. In step S404, the inverter stops the operation when the input voltage decreases to, for example, 100V or lower; when the determination in step S404 indicates the judgment of "Yes", the inverter returns to the stand-by state, and, when the determination indicates the judgment of "No", the inverter continues the intersystem-connected operations.

FIG. 3(*b*) is a flowchart illustrating the operation flows of a wind power generation apparatus. In step S410, a wind power generation apparatus initially receives a stand-by voltage, and the stand-by voltage for the stand-by state is supplied from outside and is 240V in this example. In step S411, when wind is not blowing on the windmill rotating blade 20, the stand-by state continues, and, when wind is blowing on it, the process proceeds to step S412. In step S412, the control unit 35 determines whether or not the generated electricity is less than or equal to a predetermined value (In this example, the predetermined value is 10 W. Assume that the inverter starts operations when 10 W of electricity or greater is applied to the inverter). When the determination in step S412 indicates the judgment of "Yes", then, in step S413, the control unit 35 controls the duty cycles of the switching circuits 40-1 to 40-3 to decrease the rotational frequency of the windmill rotating blade 20, thereby decreasing the electricity to be generated. In this example, the windmill rotating blade 20 is controlled to have a rate of 300 rpm. 10 W of output electricity indicates that the wind speed is almost 3 m/s.

In step S414, it is determined whether or not the output electricity is less than or equal to 10 W and the output voltage is 280V or higher. When the determination in step S414 is the judgment of "No", the process returns to step S411 without any operations being performed, and, when the judgment is "Yes", then, in step S415, the ON/OFF duty cycles of the switching circuit 31 is controlled via the shunt driver 33 to control and maintain the output voltage at 280V. The output voltage is decreased in this manner, because the output voltage is boosted via the switching of the switching circuits 40-1 to 40-3 and becomes too high while the inverter, a load, is not operated, causing a risk of destroying the circuit. Since 280V of output voltage or higher is decreased to 280V, the load increases, with the result that the rotational frequency of the windmill rotating blade 20 decreases to about 250 rpm, at which point the turning on and off of the switching circuit 31 is repeated. Without this condition being changed, the process returns to step S411.

When it is determined in step S412 that the output electricity is greater than the predetermined value (10 W), the inverter starts operations, and hence the normal control is performed in step S416. In this example, the rated power of the inverter in the constant-voltage mode causes the windmill rotating blade 20 to rotate at a fixed rotational frequency, a rate of 1280 or 600 rpm (depending on the standard of the inverter). Meanwhile, the duty cycles of the switching of the switching circuits 40-1 to 40-3 is controlled to control the generated electricity and the rotational frequency. The process then returns to step S411, and the operation continues until the inverter is turned off due to the weakening of wind.

Figure 4:
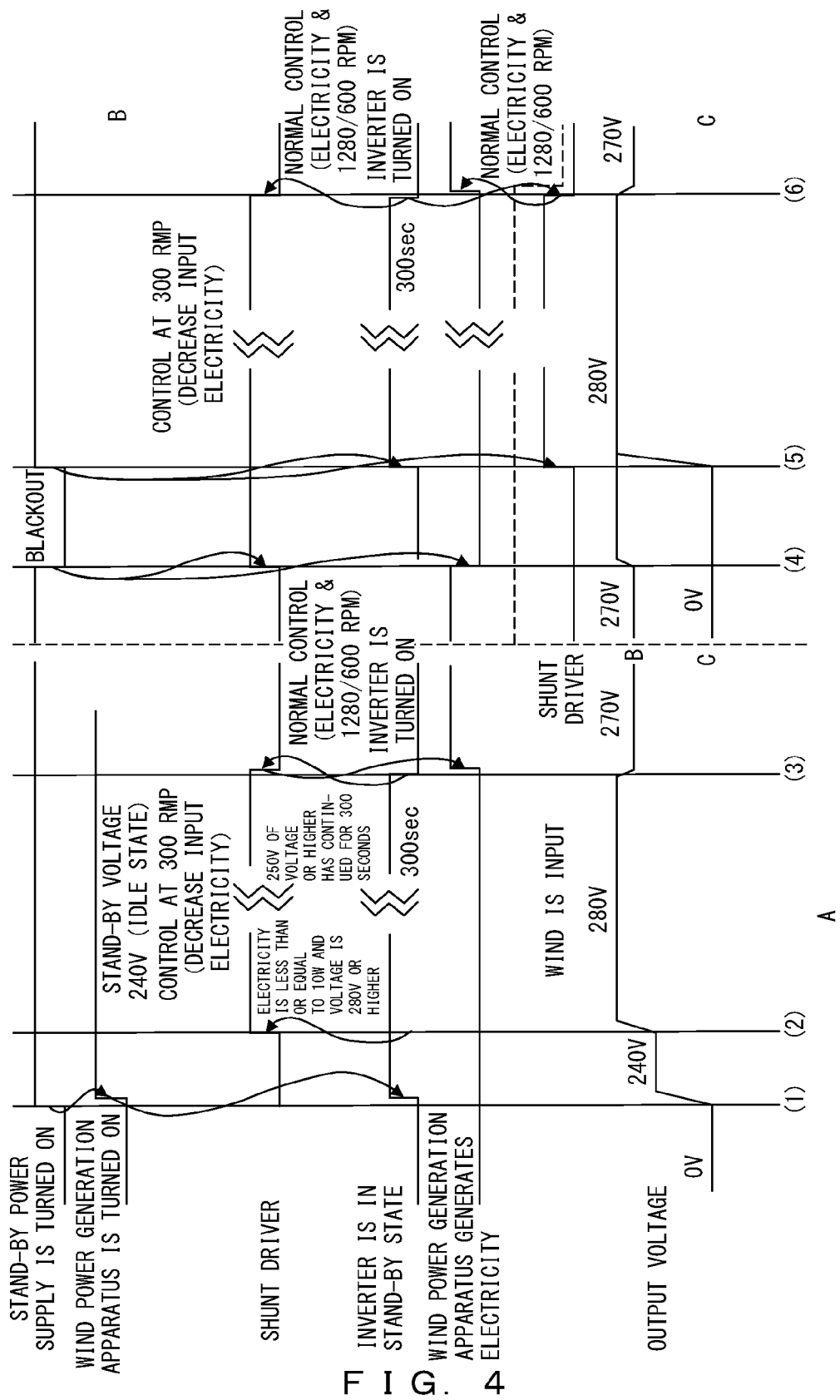
FIG. 4 is sequence diagrams illustrating operations of a wind power generation apparatus in accordance with the present embodiment.

FIG. 4 is a sequence diagram illustrating operations of a wind power generation apparatus in accordance with the present embodiment.

The sequence diagram A indicates the sequence from the initial turning on of the power supply of a wind power generation apparatus or from the activation of a wind power generation apparatus in the stopped state.

At the timing (1), the stand-by power supply is turned on, putting the wind power generation apparatus in the stand-by state. At the same time, the inverter is also put in the stand-by state. Since the stand-by voltage is 240V, the output electricity is also 240V.

Assume that wind blows at the timing (2), causing the windmill rotating blade 20 to start rotating. In this case, the control unit 35 determines whether the output electricity is less than or equal to 10 W, and it controls and maintains the rotational frequency of the windmill rotating blade 20 at 300 rpm. In the control, the duty cycles of the short-circuiting of the switching circuits 40-1 to 40-3 is changed to control the rotational frequency of the windmill rotating blade 20. The rotational speed (i.e., the rotational frequency per minute) of the windmill rotating blade 20 may be detected by a rotational frequency detection circuit 28, and hence, when the rotational frequency is larger than 300, the time period of the short-circuiting of the switching circuits 40-1 to 40-3 is made to be long, and, when the rotational frequency is smaller than 300, the time period of the short-circuiting of the switching circuits 40-1 to 40-3 is made to be short. The amount of change in the time period may be decided in advance. In this case, the rotational speed of the windmill rotating blade 20 is not always accurately 300 rpm, but, as long as it is close to 300 rpm, there is no problem. Furthermore, it is detected whether or not the voltage is 280V or higher. When the output electricity is 10 W or less and the voltage is 280V or higher, the switching circuit 31 is turned on or off via the shunt driver 33 in accordance with the controlled duty cycles in order to decrease the input voltage to the inverter to 280V.

If 250V of voltage or higher input to the inverter continues for 300 seconds (this changes depending on the type of the inverter, and it could be, for example, 30 seconds) at the timing (3) while the rotational frequency of the windmill rotating blade 20 is being controlled and maintained at 300 rpm, the inverter is activated and the shunt driver 33 turns off the switching circuit 31. The normal control then starts, so the rotational frequency of the windmill rotating blade 20 will be maintained at 1280 rpm or 600 rpm at the rated electricity.

"B" indicates the sequence from the occurrence of a blackout in the normal operation until the recovery.

When a blackout occurs and the stand-by power supply is turned off at timing (4), the shunt driver is activated simultaneously with the blackout, controls and maintains the rotation of the windmill rotating blade 20 at 300 rpm, and decreases the input electricity to the inverter.

Upon the termination of the blackout at timing (5), the inverter is put in the stand-by state and is then turned on at the time (6) at which 250V of voltage or higher input to the inverter has continued for 300 seconds.

At (6) and after, normal control is performed such that the rated electricity is generated and the rotational frequency of 1280 rpm or 600 rpm is maintained.

The sequence "C" indicates a situation in which a wind power generation apparatus was stopped before a blackout and has wind blowing on it to generate electricity after the blackout.

Even when a blackout occurs at the timing (4), the output voltage will be 0V since the operation had been shut down before the blackout.

When the blackout is terminated at the timing (5), the rotational frequency of the windmill rotating blade 20 is set to 300 rmp and the shunt driver is activated to control and maintain the output voltage at 280V. The inverter is turned on at the time (6) at which 250V of voltage or higher input to the inverter has continued for 300 seconds.

At the time (6) and after, the rated electricity is generated under the normal control, and the rotational frequency is maintained at 1280 rpm or 600 rpm.

EXPLANATION OF THE CODES

1 Wind power generation control apparatus
2 Wind power generator
11 Current A/D conversion unit
12 Voltage A/D conversion unit
13 Rotational speed calculation unit
14 Rpm/power computation unit
15 Calculation control unit
16, 34 PWM modulation unit
20 Windmill rotating blade
21 Permanent magnet
22 Winding
23 Rectifier
24 Storage cell
25 Load
26 Current detection circuit
27 Voltage detection circuit
28 Rotational speed detection circuit
29 Driver
30 Inverter
31 and 40-1 to 40-3 Switching circuit
32 Resistor
33 Shunt driver
35 Control unit

The invention claimed is:
1. A wind power generation apparatus comprising:
a generator composed of a magnet and an armature winding and having a windmill rotating blade;
a switch unit controlling a rotational speed of the windmill rotating blade by short-circuiting the armature winding at controlled duty cycles;
a shunt unit controlling an output voltage of the generator by intermittently connecting a resistor to an output of the generator; and a control unit, when an inverter that is in a constant-voltage mode in which the inverter is operated at a rated constant voltage, is connected as a load, then, before the inverter is turned on, controlling and maintaining the rotational speed of the windmill rotating blade at a predetermined value by the switch unit short-circuiting the armature winding at the controlled duty cycles and controlling and maintaining the output voltage at a predetermined value by using the shunt unit intermittently connecting the resistor to the output of the generator to prevent a voltage applied to the inverter from becoming too high, and, after the inverter is turned on, using the switch unit to control the rotational speed of the windmill rotating blade to maintain a constant value of the voltage applied to the inverter.

2. The wind power generation apparatus according to claim 1, wherein
the switch unit controls the rotational speed of the windmill rotating blade and boosts the output voltage by short-circuiting the armature winding at the controlled duty cycles.

3. The wind power generation apparatus according to claim 1, wherein
after the inverter is turned off, the control unit controls and maintains the rotational speed of the windmill rotating blade at the predetermined value by the switch unit short-circuiting the armature winding at the controlled duty cycles.

4. The wind power generation apparatus according to claim 1, wherein
in order to brake the windmill rotating blade, the control unit controls the duty cycles to extend, step by step, a time period during which the switch unit is short-circuited.

* * * * *